VICTOR G. BLOEDE, OF BROOKLYN, NEW YORK.

*Letters Patent No. 86,636, dated February 9, 1869.*

IMPROVED COMPOUND FOR REMOVING SILVER-STAINS

The Schedule referred to in these Letters Patent and making part of the same.

*To all whom it may concern:*

Be it known that I, VICTOR G. BLOEDE, of the city of Brooklyn, county of Kings, and State of New York, have invented a new and improved Compound for Removing the Stains Produced upon the Hands and Clothes by the Solutions of the Silver and Gold Salts; and I do hereby declare that the following is a clear, full, and concise description of the process and formulæ employed in its manufacture, such as will enable others skilled in the art to make use of my invention.

The nature of my invention consists in combining the cyanide of potassa and the sulphocyanide of potassa or ammonia, either separately (or, preferably yet, both combined) with fatty or soapy matter, adding thereto a certain amount of gritty matter, such as very fine sand, or impalpable pumice or emery-powder, in order to heighten its erasive power.

The great advantage of this compound over the plain cyanide is that, while the dissolving and erasive properties of the compound are equal or superior to the pure cyanide, the very poisonous qualities of the latter are greatly lessened and neutralized.

To produce a compound having the desired qualities, I proceed as follows:

I make two lyes, the first with one drachm of pure caustic soda added to one ounce of water; the second consisting of one drachm of soda to two ounces of water. A good ounce and a half of the finest beef-suet is then melted in a pan, over hot water, and strained through a cloth, to purify it. It is then added to the weaker lye, and the mixture is brought to boiling, while the stronger lye is added in small portions, so as not to interrupt the boiling.

When the mixture has assumed a uniform gluey consistency, and finally becomes thick and frothy, half an ounce of table-salt should be added, and the boiling continued for five minutes longer. The whole mixture is then allowed to cool.

The soap, which has settled to the bottom, may be squeezed as dry as possible, and being slightly washed, to remove the salt water, is allowed to dry.

When the soap has become sufficiently dry, it is rasped or grated to a fine powder, and this powder is placed upon iron pans, and exposed to the sun, in hot weather, or placed in a slightly-warmed oven until it is as dry as it can be made.

When this result has been accomplished, the rasped soap is to be thoroughly kneaded, and incorporated with the following solution:

Water, one-half ounce; and cyanide of potassa and sulphocyanide of potassa to saturation.

The cyanide is added first, in a powdered, but well-dried form, and when the water is saturated, some sulphocyanide is added. The solution, thus made, is added, drop by drop, to the soap-raspings until the latter become of the consistency of soft dough. The pumice-powder is now added in quantity sufficient, and the whole, after being thoroughly kneaded and mixed, is pressed into cakes of convenient size, and allowed to become thoroughly dry.

The cyanides may also be added to ready-made soap in the dry state, but this gives a much inferior result.

Another good combination is produced by melting the soap produced in the last formula, (before the addition of pumice,) and soaking it up into squares of fine-grained pumice-stone.

I do not claim the use of the cyanide or the sulphocyanide of potassa for removing gold and silver-stains; but What I do claim as my invention, and desire to secure by Letters Patent, is—

The production of new and useful compounds by the combination of the cyanide of potassa, or other equivalent cyanide, with fatty or soapy matter, and the heightening of its erasive power by the addition of powdered pumice-stone, or other gritty matter.

VICTOR G. BLOEDE. [L S.]

Witnesses:
   H. McCROSSIN,
   ADOLF SCHAUMANN.